United States Patent [19]
Baird et al.

[11] Patent Number: 5,114,159
[45] Date of Patent: May 19, 1992

[54] BRUSH SEAL AND DAMPER

[75] Inventors: Donald J. Baird, Jupiter; Brett D. Rhodes, Palm Beach Gardens; William W. Griffin, Jr., Jupiter, all of Fla.

[73] Assignee: United Technologies Corporation, Hartford, Conn.

[21] Appl. No.: 740,537

[22] Filed: Aug. 5, 1991

[51] Int. Cl.⁵ .............................. F16J 15/447
[52] U.S. Cl. ........................ 277/53; 415/173.7; 415/174.2
[58] Field of Search ............... 277/53, 189; 415/170.1, 415/173.1, 173.3, 173.4, 173.6, 173.7, 174.2, 174.4

[56] References Cited
U.S. PATENT DOCUMENTS

| | | | |
|---|---|---|---|
| 907,981 | 12/1908 | Ferranti | 415/173.6 |
| 3,019,035 | 1/1962 | Klompas | 277/53 X |
| 3,829,233 | 8/1974 | Scalzo et al. | 277/53 X |
| 3,917,150 | 11/1975 | Ferguson et al. | 277/53 X |
| 3,941,500 | 3/1976 | Glenn | 277/53 X |
| 4,202,554 | 5/1980 | Snell | 277/53 |
| 4,358,120 | 11/1982 | Moore | |
| 4,415,309 | 11/1983 | Atterbury | 415/173.7 X |
| 4,645,424 | 2/1987 | Peters | |
| 4,756,536 | 7/1988 | Belcher | |
| 5,080,557 | 1/1992 | Berger | 277/53 X |

Primary Examiner—Allan N. Shoap
Assistant Examiner—Scott W. Cummings
Attorney, Agent, or Firm—Edward L. Kochey, Jr.

[57] ABSTRACT

Brush seals 30 are secured to segmented vane platforms 20. Inwardly extending bristles 42 seal against rotor 10. Outwardly extending bristles 46 seal against the vane platform 20, and also act as vibration dampers.

8 Claims, 2 Drawing Sheets

BRUSH SEAL AND DAMPER

The Government has rights in certain claims to a contract awarded by the Department of Air Force.

TECHNICAL FIELD

The invention relates to gas turbine engines and in particular to reducing leakage past and damping vibration of stator stages.

BACKGROUND OF THE INVENTION

Compressors of gas turbine engines have alternating rows of rotating blades and stationary vanes. The vanes have vane platforms located adjacent the rotor for the purpose of containing the gas flow. This requires seals to limit air recirculation around the platform. Conventionally these are labyrinth type seals with knife edges on the rotor and an abradable surface on the vane platform. Also, the vane platform segment circumferential thermal growth gaps allow gas path air to bypass around the vanes. Similar seals are required to limit the gas flow bypass as well as between the rotor and vane.

Because of circumferential thermal growth the vane platforms are frequently segmented permitting the growth without a stress buildup. The vanes and platforms are therefore subject to vibration and dampers are required to deter this vibration.

Vane platform and any seal secured thereto has a radial movement which is a function of the expansion of the outer casing to which the vanes are secured, and the expansion of the vanes. The portion of the seal secured to the rotor shaft has a radial expansion which is a function of the temperature and structure of the shaft assembly. Differential radial expansion is experienced which leads to opening up of the conventional labyrinth type seals during certain operating conditions, and the concomitant increased leakage.

DESCRIPTION OF THE INVENTION

Figure 1:
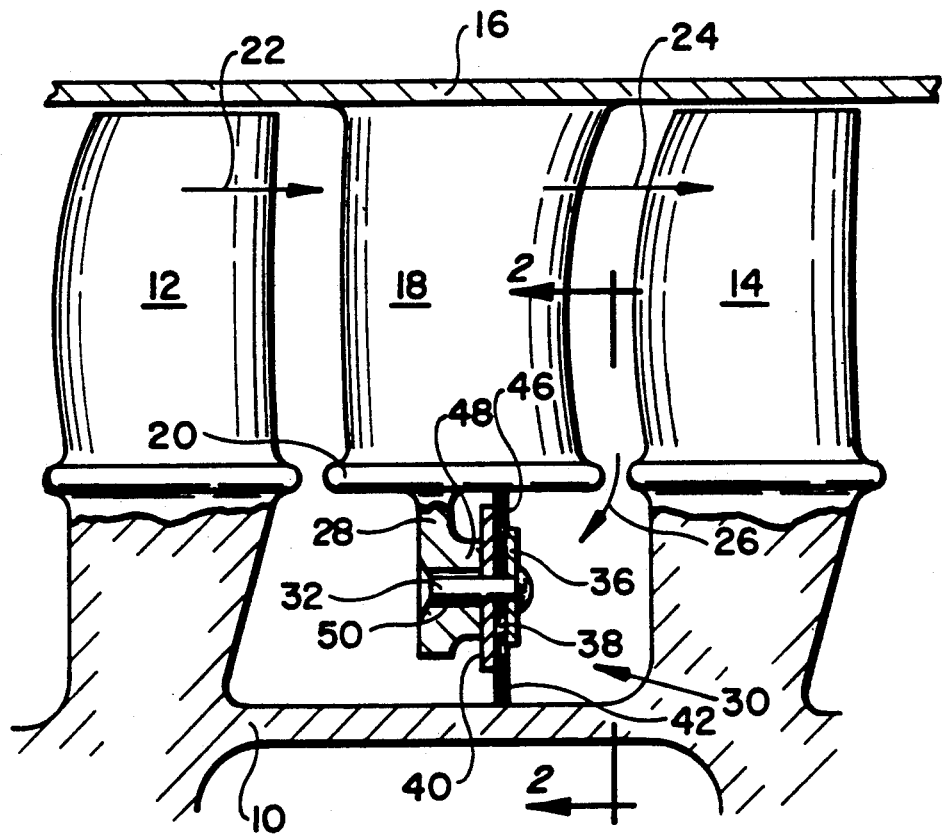
FIG. 1 is a side view of a row of stator vanes and the two adjacent rotor stages.

Referring to FIG. 1 compressor rotor 10 of a gas turbine engine carries first stage blades 12 and second stage blades 14. Secured to casing 16 are a plurality of stationary vanes 18. Vane platform 20 confines gas flow.

This vane platform 20 is segmented to permit differential thermal growth without excessive thermal stresses. .

Compressor airflow 22 is established at high velocity by blades 12 and the high velocity being transformed in part to high static pressure at airflow location 24. Arrow 26 indicates the tendency for recirculation flow.

Each vane platform segment 20 has a vane rail 28 integral with blade platform and perpendicular thereto. This vane rail extends radially inwardly and circumferentially.

Figure 2:
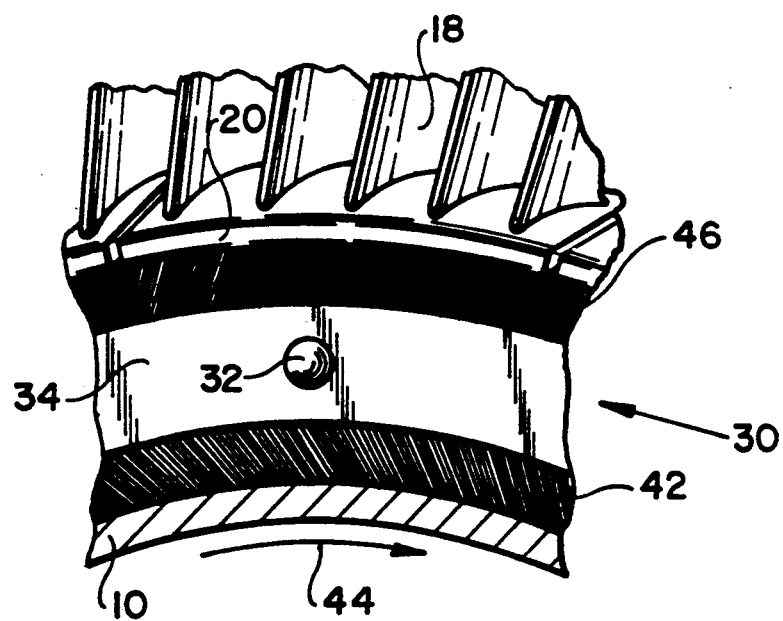
FIG. 2 is an axial view of a brush seal arrangement.

Brush seal 30 is secured to vane rail 28 by a fastener such as rivet 32 or a bolt. Referring also to FIG. 2, each brush seal assembly 30 has an arcuate bristle support 34 comprised of a first arcuate plate 36 on one side of bristles 38 and a second arcuate support plate 40 on the other side. Such brush seals are conventionally formed by welding through the center of the arcuate plates to fuse the bristles along with the plates. The inwardly extending bristles 42 are tightly packed and secured to the support 34, and extend inwardly at an angle to the radial direction in the same direction as the direction of rotation 44 of the rotor. These bristles resiliently bear on the rotor in sealing contact.

The outwardly extending bristles 46 extend outwardly at an angle with respect to the radial direction opposite that of the inwardly extending bristles 42. There is no relative rotational movement between these bristles and the vane platforms 20 during operation. These bristles operate as a static seal to prevent leakage and also are biased against the vane platform to dampen vibration of the platform and the vanes.

The inwardly facing bristles must face in the same direction as the direction of rotation to make them more compliant to rotor radial excursions. Any circumferential movement of the brush seal during installation should be to the left as illustrated so as to avoid damage to the outwardly extending brush seals as they interact with the vane platform. In the compressor installation shown in FIG. 1, the high pressure is on the righthand side of the brush seal and the lower pressure exists on the left side. Accordingly, the second plate 40 has a more extensive radial dimension than the first plate 36. This supports the bristles against differential pressure.

Boss 48 maintains the brush seal offset from the rail 28. A slight radial slot 50 may be provided in the rail to permit some radial adjustment or floating of the seal to balance the forces Such radial slot, however, should be limited so that the seal is not overcompressed or damaged during installation.

The brush seal extends arcuately through a plurality of vane platform segments It may be secured to circumferentially slotted openings in the alternate platforms, it may be simply abutting the other platforms, or it may be secured to two different segments. The inboard bristles 42 serve as a conventional brush seal with the rotor 20 rotating against the resilient bristles. The outwardly extending bristles 46 act as a packing to seal against leakage and also dampen vibration.

Figure 3:
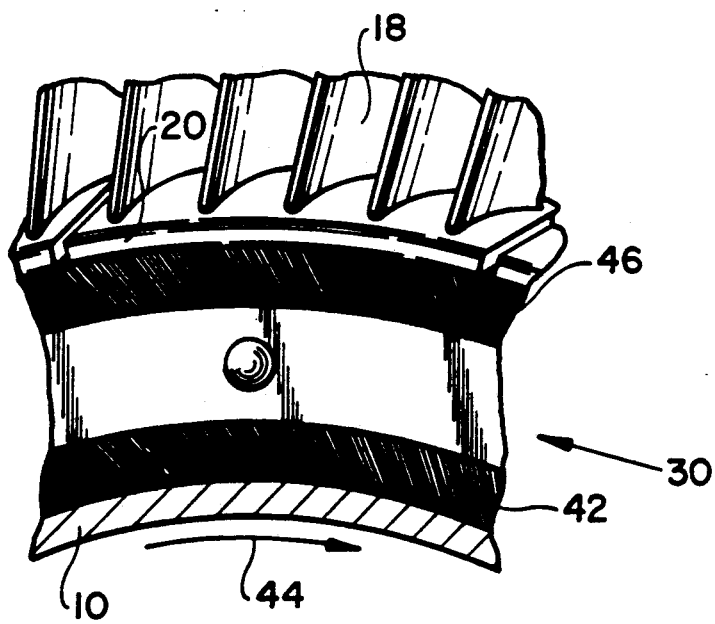
FIG. 3 is an axial view of a brush seal arrangement with different brush orientation.

FIG. 3 is a view similar to FIG. 2 except that the outboard bristles 46 extend outwardly at approximately the same angle with respect to the radial direction inwardly extending bristles 42. This permits fabrication of the brush seal assembly 30 with single bristles. It is preferable that the outwardly extended bristles 46 extend at an angle more oblique to the radial direction than those of the inwardly extending bristles 42 since there is more circumference to be covered and the packing density may more readily be retained.

Figure 4:
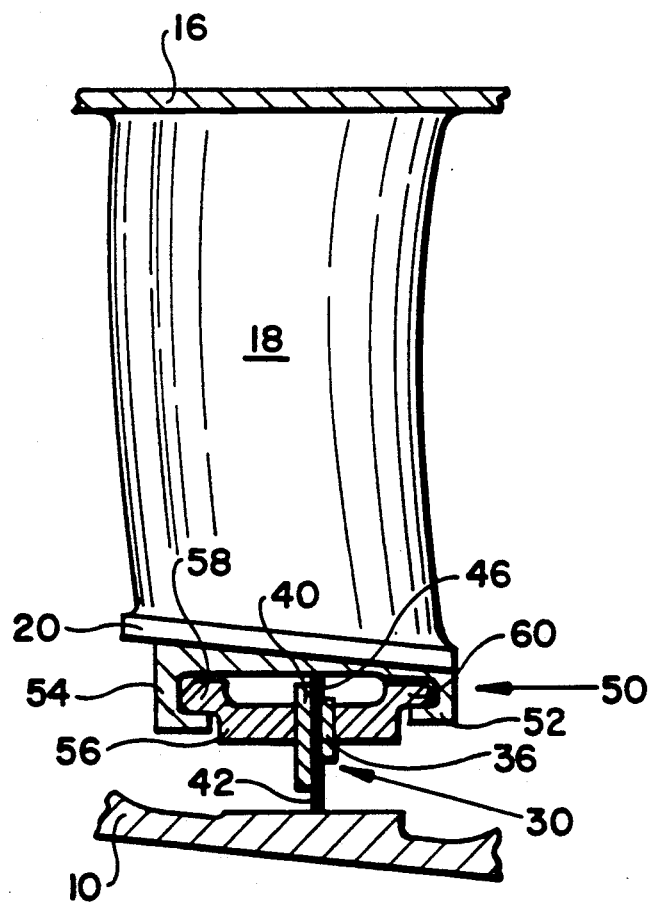
FIG. 4 is a side view showing an alternate seal arrangement.

An alternate arrangement is shown in FIG. 4 wherein each vane platform segment 20 has a circumferentially extending track 50 formed of a first inwardly facing C member 52 and a second inwardly facing C member 54. A seal carrier 56 is slid circumferentially through the tracks of a plurality of vane platform segments during construction of the compressor. This is accomplished with the split casing exposing one-half of the stator at a time. A hammerhead on the end of the seal carrier limits circumferential movement The brush seal assembly 30 is secured to this seal carrier; Resilient bristles 42 are again in sealing contact with rotor 10 while the outwardly facing resilient bristles 46 are in contact with the vane platform of each segment through the local segment of the track.

It can be seen that tongue 58 of the seal carrier is wider than tongue 60 of the carrier and the correspondingly groove of C-shaped member 54 is wider than the groove of C-shaped member 52. This makes it impossible to install the seal in the reverse direction where the bristles 42 would be angled into the direction of rotation.

The seal is lightweight and less costly as compared to alternate designs. Sealing is accomplished as well as preloading and damping of the vanes. Radial differential expansions caused by temperature differences are tolerated without loss of sealing or damping by the resilient brushes.

We claim:

1. A gas turbine engine interstage seal arrangement comprising:
    a plurality of stationary vanes annularly disposed around said rotor shaft;
    a plurality of vane platforms secured to said vanes and spaced from said rotor shaft;
    a plurality of arcuate brush seal assemblies, each brush seal assembly having an arcuate bristle support;
    a plurality of inboard resilient bristles, tightly packed, secured to said support, and extending inwardly at an angle to the radial direction, a plurality of outboard resilient bristles, that are tightly packed, secured to said support, and extending outward at an angle to the radial direction; and
    each brush seal assembly supported from a vane platform with said inboard bristles in sealing contact with said vane platform, and said outboard bristles in sealing contact with said rotor.

2. A seal arrangement as in claim 1 comprising also:
    said inboard bristles and said outboard bristles extending at approximately the same angle to the radial direction.

3. A seal arrangement as in claim 1 comprising also:
    said inboard bristles and said outboard bristles extend at opposite angles with respect to the radial direction.

4. A seal arrangement as in claim 1 comprising also:
    a circumferentially and radially inwardly extending vane rail integral with each vane platform; and
    each brush seal assembly secured to at least one of said vane rails.

5. A seal arrangement as in claim 4 comprising also:
    said brush seal located on the high pressure side of said vane rail.

6. A seal arrangement as in claim 1 comprising also:
    a circumferentially extending groove track on each vane platform;
    a circumferentially extending seal carrier engaged with said groove tracks in tongue and groove relationship; and
    said brush seal assembly secured to said seal carrier.

7. A seal arrangement as in claim 6 comprising also:
    said groove track comprising two inwardly facing C-shaped members; and
    said seal carrier comprising two outwardly facing tongues one of said tongues fitting within each of said sea members.

8. A seal arrangement as in claim 7 comprising also:
    said C-shaped members and the corresponding tounges having different thicknesses, whereby reverse installation of said seal carrier is not possible.

* * * * *